United States Patent [19]

Levine et al.

[11] 4,437,764

[45] Mar. 20, 1984

[54] ELECTRICAL COMPENSATION FOR MISREGISTRATION OF STRIPED COLOR FILTER IN A COLOR IMAGER WITH DISCRETE SAMPLING ELEMENTS

[75] Inventors: Peter A. Levine, West Windsor; Allen L. Limberg, Titusville, both of N.J.

[73] Assignee: RCA Corporation, New York, N.Y.

[21] Appl. No.: 327,582

[22] Filed: Dec. 4, 1981

[51] Int. Cl.³ .............................................. H04N 9/07
[52] U.S. Cl. .................................................... 358/44
[58] Field of Search .............................. 358/44, 51, 43

[56] References Cited

U.S. PATENT DOCUMENTS

| | | | |
|---|---|---|---|
| 4,249,203 | 2/1981 | Yamanaka | 358/50 |
| 4,277,801 | 7/1981 | Rhodes | 358/55 |
| 4,286,285 | 8/1981 | Rhodes | 358/44 |
| 4,288,812 | 9/1981 | Rhodes | 358/44 |
| 4,290,671 | 9/1981 | Rhodes et al. | 358/17 |
| 4,318,123 | 3/1982 | Knop | 358/44 |

*Primary Examiner*—John C. Martin
*Attorney, Agent, or Firm*—E. M. Whitacre; W. H. Meise; H. I. Steckler

[57] ABSTRACT

Color signal samples generated by CCD imagers used with a color stripe filter normally exhibit hue errors owing to cross-color components in the samples arising from misalignment of the color striped imager on the imager elements. These cross-color components are suppressed in the invention, by re-sampling the color signals.

7 Claims, 6 Drawing Figures

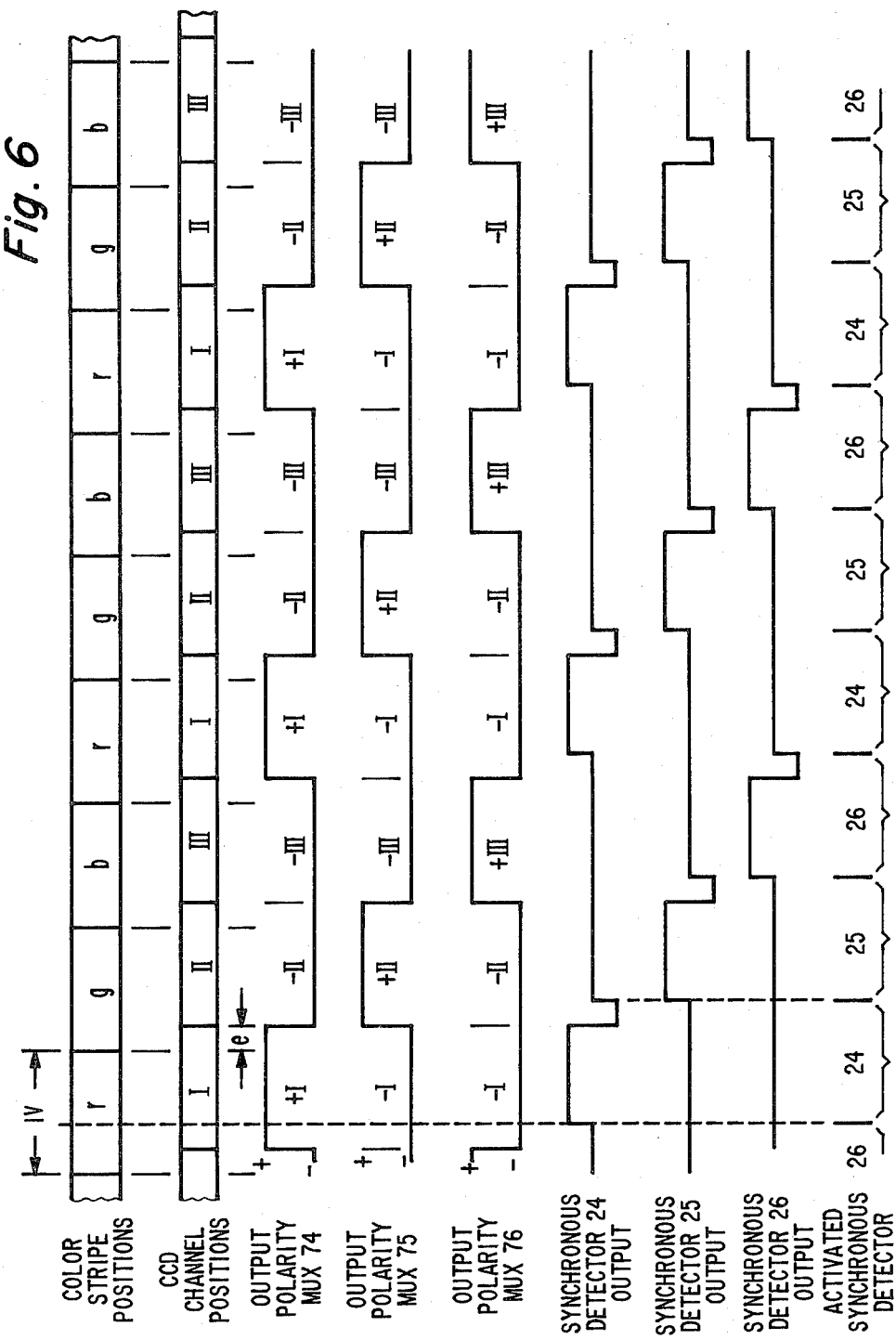

ELECTRICAL COMPENSATION FOR MISREGISTRATION OF STRIPED COLOR FILTER IN A COLOR IMAGER WITH DISCRETE SAMPLING ELEMENTS

BACKGROUND OF THE INVENTION

The present invention relates to imagers, such as CCD imagers, having discrete sampling elements, operated in combination with a striped color filter for generating color signals as may be multiplexed into a color television signal, and, more particularly, to color signal matrixing adjustments to lessen the effects upon the color signals of misregistration of the stripes in the color filter and the columns of discrete sampling elements.

SUMMARY OF THE INVENTION

Matrixing adjustments are made per the present invention by resampling the color signal samples to convert the hue errors owing to such misregistration, which errors are intrusively visible to a viewer of the display, to unobtrusive minor color saturation errors.

DESCRIPTION OF THE DRAWING

FIG. 6 is a diagram of the relative spatial phasing of the color filter stripe positions and the imager columns plotted in parallel with the timing phasing of the synchronous detection samples, which is useful in explaining the working of the invention when the stripes of the color filter are cyclically red, green and blue.

DETAILED DESCRIPTION

Figure 1:
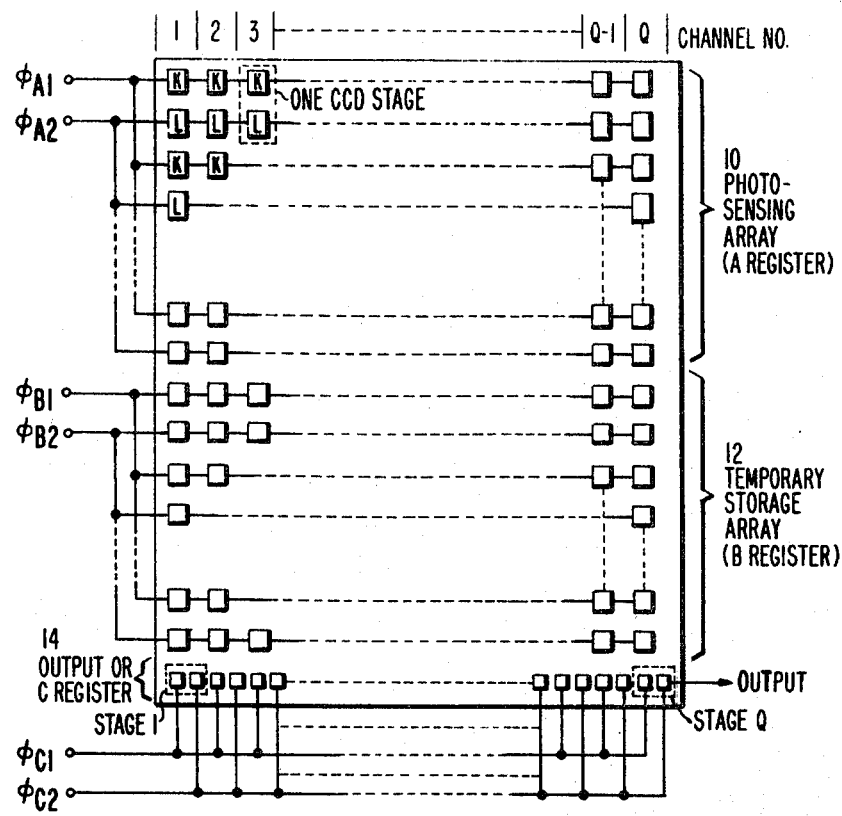
FIG. 1 is a diagram of a prior art CCD imager.

The known system of FIG. 1, a two-phase charge-coupled device (CCD) imager, includes a photosensing array 10, known as an A-register or imaging register, a temporary storage array 12, known as a B-register or field-transfer register, and an output, line-transfer register 14, known as a C-register. The B- and C-registers are masked; i.e., means are provided for preventing a radiant energy image from reaching either register.

The A- and B-registers may have channel stops (not shown explicitly) extending in the column direction to isolate the channels (the columns of the CCD) from one another. The electrodes (K and L, per stage) shown schematically, may be any one of the usual overlapped polysilicon, or polysilicon overlapped by metal, or other two-phase structures for insuring unidirectional signal propagation. The imager, while illustrated to be two-phase operated may, of course, be a three or higher phase operated imager instead. One such imager commercially available from RCA Corporation as SID 52501 and known as "Big Sid" employs a single-layer electrode structure, is three-phase operated, and has 320 columns and 512 rows (256 in the A register and 256 in the B register).

The operation of the array of FIG. 1 is well understood. During the so-called integration time, a scene or other image is projected onto the A-register. The light or other radiant energy of the image causes charges to be produced at the various locations of the A-register, in accordance with the light intensity reaching the respective locations.

Upon the completion of the integration time (during the vertical blanking interval of the television signal generated based on the image samples from the imager), the charge signals which have accumulated (a "field") are transferred, in parallel, in the column direction from the A-register to the B-register by the application of the multiple phase voltages $\phi_{A1}$, $\phi_{A2}$, $\phi_{B1}$ and $\phi_{B2}$. During this field transfer time, a shutter may mask the A register to prevent smearing of the image. Alternatively the A-register may remain unmasked and smear reduction techniques as described by P. A. Levine in U.S. Pat. No. 4,010,319 issued 1 Mar. 1977 and entitled "SMEAR REDUCTION IN CCD IMAGERS" may be employed.

The charges subsequently are transferred, a row at a time, from the output stage of the B-register to the C-register. After each row of charges reaches the C-register, it is serially shifted out of the C-register in response to the shift voltages $\phi_{C1}$, $\phi_{C2}$. The serial shifting along the C-register occurs at relatively high speed (during a "line time" of the television signal generated based on the image sampling from the imager). During the transfer of a field from the B-register to the C-register, a new field is integrated in the A-register.

Figure 2:
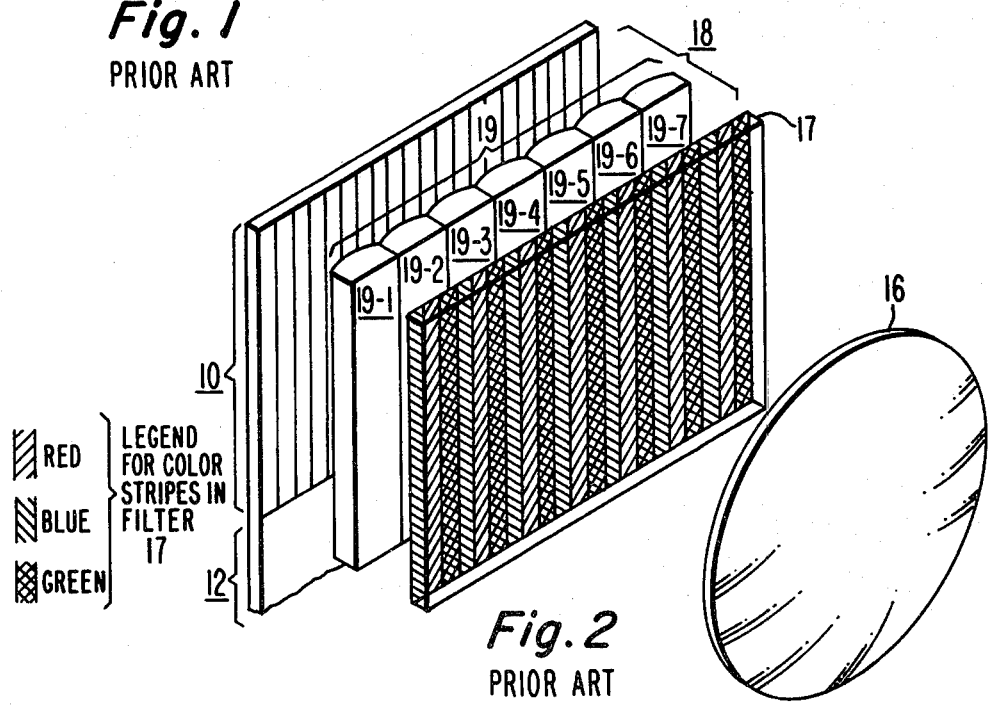
FIG. 2 is a partially exploded view of the optical path arrangement for operating the FIG. 1 CCD imager together with a color stripe filter to form, as known in the prior art, a color television camera.

As illustrated in FIG. 2, such a CCD imager can be adapted for use in a color television camera using an objective lens 16 for focusing the optical image of an object (not shown, but assumed to be below right off-figure) passed through a striped color filter 17 and "relay" optics 18 onto the A-register 10 of the CCD imager, so that the stripes of the filter image are in registration with corresponding columns of A register 10. Elements 16 and 17 are shown in simplified form. A preferred form for the relay optics 18 uses a lenticular array 19 comprising periodic cylindric lenslets, 19-1, 19-2, . . . 19-7 as shown in simplified form in FIG. 2 and as more fully described by K. H. Knop in U.S. Pat. No. 4,318,123, entitled "SOLID-STATE COLOR-ENCODING TELEVISION CAMERA". The color filter 17 has stripes that are cyclically one of the three colors—e.g., red, green, and blue. The stripes are of such widths and orientation that ideally the relay optics 18 images them in superposition over the columns of the CCD imager A-register 10. The projected image of these color stripes for a white field image is shown on the surface of the A-register 10, and ideally each column of the sensing elements should be aligned behind a respective one of the stripes.

The objective lens 16 is a simplified representation of the multiple lens system with zooming capability found in normal color TV cameras. In actuality the color stripe filter 17 is likely to have somewhere around a thousand stripes; and the lenticular lens in the relay optics 18 has many more lenslets than shown. The simplifications in FIG. 2 have been made for clarity of illustration. Also the color stripe filter 17, the lenticular lens 19 and the A register 10 are shown in exploded view. The lenticular lens 19 and the color stripe filter 17 are actually very close together, the optical flats they are on usually being cemented together. The resulting composite structure is then mounted next to the A-register 10 of the CCD imager so the image of the filter stripes falls on the register in such a way that adjacent columns of the A-register are illuminated by different colors. It is difficult, however, to obtain perfect registration of the different color stripes with the columns of the A-register 10.

Misregistration of the color stripes with the columns of register 10 causes cross-color errors visible as hue changes across the display screen. Skewing of the stripes will cause hue change from top to bottom of screen, for example. Run-out between the widths of the color stripes and the widths of the A-register 10 columns will cause hue change from side-to-side of screen, as another example. Combinations of these effects may be observed, as well. Experimenters expended a great deal of effort trying with less than complete success to eliminate these color-stripe misregistration problems. P. A. Levine in his concurrently filed and similarly titled U.S. patent application Ser. No. 327,594 describes how the cross-color errors can be redistributed amongst the color samples to appear as color saturation errors, rather than as the hue errors so readily visible to the viewer of the display generated from the color camera output signals. As pointed out in that application during the course of practical manufacture some degree of color-stripe misregistration is likely to be encountered in most of the single-chip color CCD imagers manufactured, so an apparatus for electrically correcting the successive signal samples supplied from output stage Q of C-register 14 in such an imager is of great practical interest.

Figure 3:
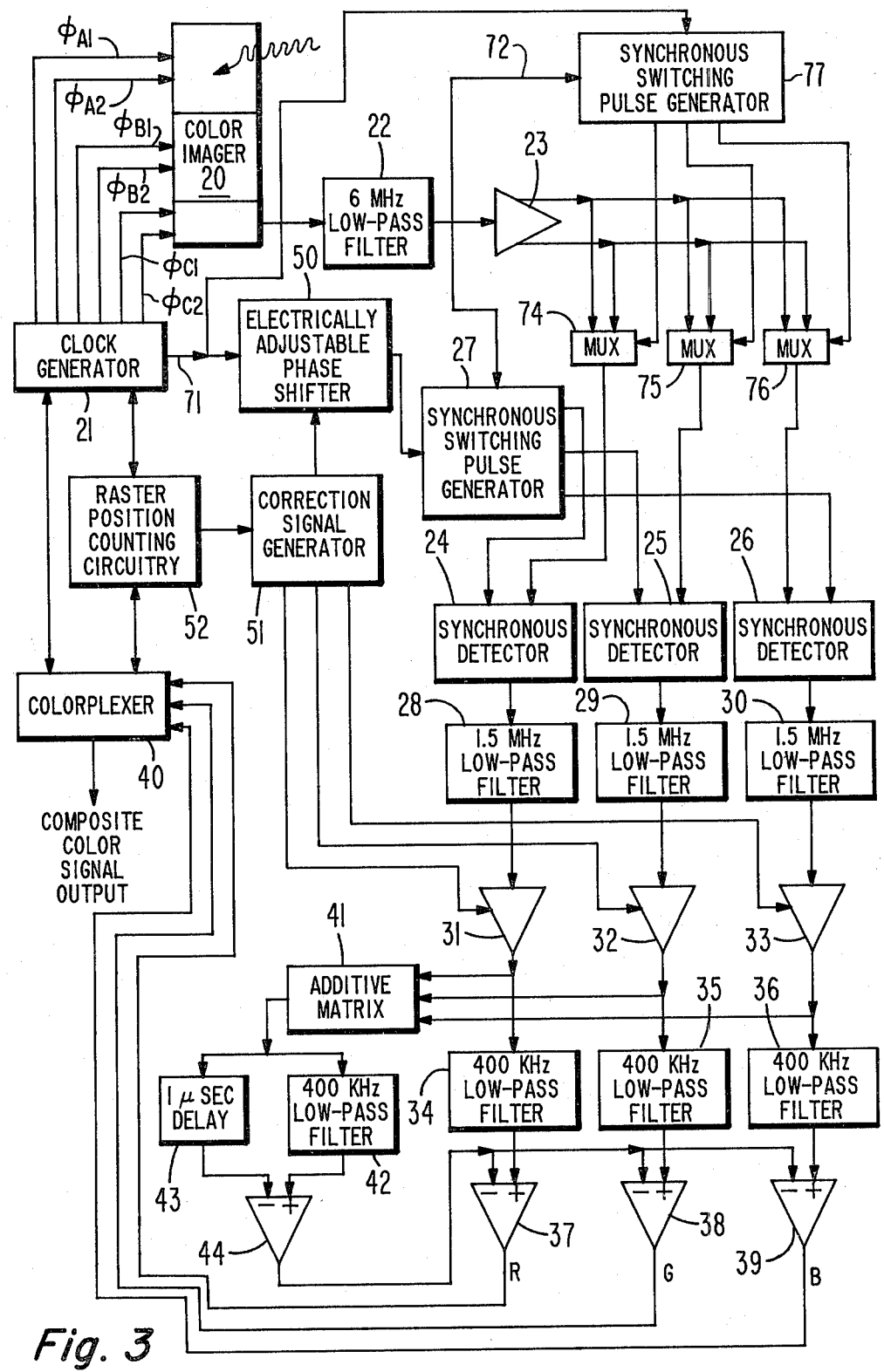
FIG. 3 is a schematic diagram of the combination, in accordance with the present invention, of such a color television camera with electrically adjustable matrixing for transforming highly visible hue errors owing to color filter stripe misalignment to relatively unobjectionable amplitude errors.

FIG. 3 shows how the successive samples of the image supplied from the output stage of a color CCD imager 20 are processed to develop a composite color signal. The color CCD imager 20 is shown being supplied clock signals from a clock generator 21. Two phases $\phi_{A1}$ and $\phi_{A2}$ of clock signal, usually of a frequency higher than line frequency, are applied to the A-register of imager 20 during field transfer time, and the two phases of clock signal $\phi_{B1}$ and $\phi_{B2}$ supplied to the B register of imager 20 during field transfer time correspond to $\phi_{A1}$ and $\phi_{A2}$. During integration time, $\phi_{A1}$ and $\phi_{A2}$ clock signals are discontinued, and the $\phi_{B1}$ and $\phi_{B2}$ clock signals are supplied at line advance rate. During each line scan interval the C-register is supplied, at pixel scan rate, two-phase clock signals $\phi_{C1}$ and $\phi_{C2}$. Responsive to them successive red, green and blue samples of the image from the previous integration time are transfered to the output of the C-register and out of the color CCD imager 20. The output from imager 20 is a time-division-multiplexing of red, green, and blue image samples. In a design using the Big Sid imager these samples are supplied at a 6 MHz rate.

The samples are accompanied by switching transients from the C-register clocking, which are suppressed by a low-pass filter 22. To avoid smearing of one color sample into another, this filter has a roll-off frequency close to sample rate, or sampling carrier frequency (6 MHz for the design using Big Sid). This suppresses transients, but affects the phasing of the color samples only slightly, so they may be re-sampled in accordance with the invention. This filtering practice departs from that used in connection with monochromatic CCD imagers, in which the low-pass filter cut-off frequency is well below sampling carrier frequency. The low-pass filter is followed by a buffer amplifier 23, which has first and second outputs providing amplified voltage responses of opposite respective polarities, to the signal applied to its input. The amount of amplification is sufficient that signal routed through multiplexers 74, 75 and 76 and supplied to synchronous detectors 24, 25, and 26 is of large enough amplitude that noise in the switching devices in the multiplexers and synchronous detectors does not contribute appreciably to noise in the detector outputs.

Pulses of the clock frequency associated with the $\phi_{C1}$ and $\phi_{C2}$ phases of C-register clocking are derived from an output 71 of clock generator 21 for application to a synchronous switching pulse generator 77. The pulses of clock frequency are divided into groups of three by synchronous switching pulse generator 77, the first pulse of each group being applied to a multiplexer 74 to cause it to select the positive-polarity output of buffer amplifier 23 to be forwarded to the input of synchronous detector 24, rather than the negative-polarity output it otherwise selects. The second pulse of each group is applied to a multiplexer 75 to cause it to select the positive-polarity output of buffer amplifier 23, to be forwarded to the input of synchronous detector 25, rather than the negative-polarity output it otherwise selects. The third pulse of each group is applied to a multiplexer 76 to cause it to select the positive-polarity output of buffer amplifier 23 to be forwarded to the input of synchronous detector 26, rather than the negative-polarity output it otherwise selects.

Pulses of the clock frequency from output 71 of clock generator 21 are applied to the input of an electrically adjustable pulse phase shifter 50, the output of which supplies clock frequency pulses of adjusted phasing to the input of a synchronous switching pulse generator 27 of the same type as synchronous switching pulse generator 77. These generators have a synchronizing interconnection 72 so that the division of clock frequency pulses into groups of three is such that first pulses of the groups as selected by generator 27 occur during most of the time when multiplexer 74 selects positive-polarity output from buffer amplifier 23 as input to synchronous detector 24, such that second pulses of the groups as selected by generator 27 occur during most of the time multiplexer 75 selects positive-polarity output from buffer amplifier 23 as input to synchronous detector 25, and such that third pulses of the group as selected by generator 27 occur during most of the time multiplexer 76 selects positive-polarity output from buffer amplifier 23 as input to synchronous detector 26. The first pulses of the groups selected by generator 27 are applied to an input of a de-multiplexer, or synchronous detector, 24 to close a switch and charge a capacitor therein. The second pulses of the groups selected by generator 27 are applied to an input of a de-multiplexer, or synchronous detector, 25 to close a switch and charge a capacitor therein. And the third pulses of the groups selected by generator 27 are applied to an input of a de-multiplexer, or synchronous detector, 26 to close a switch and charge a capacitor therein. Accordingly, voltages responsive to successive samples of the red, green, and blue portions of the image appear at the outputs of synchronous detectors 24, 25 and 26, respectively. When a signal having the proper phase is provided by generator 50, there will be substantially no cross-color contamination in these sample voltages, as explained in detail below.

These voltages are applied to the inputs of low-pass filters 28, 29, and 30 which have a cut-off frequency below switching carrier frequency in synchronous detectors 24, 25, 26—2 MHz in the design example using Big Sid—by an amount greater than chroma signal bandwidth, as defined by low pass filters 34, 35, and 36. The low-pass filters 28, 29, and 30 suppress aliasing in the synchronous detector 24, 25, 26 R, G, B outputs. Their outputs are shown connected in turn to the inputs of buffer amplifiers 31, 32, and 33.

A system of mixed highs is used to raise the effective image-sampling rate for luminance while suppressing tendencies toward chroma beats. The outputs of buffer amplifiers 31, 32, and 33 are applied to the inputs of low-pass filters 34, 35, and 36, respectively, which separate the lower frequency portions of these R, G, and B signals for application to the non-inverting inputs of differential-input amplifiers 37, 38, and 39 respectively. The inverting inputs of these differential-input amplifiers are supplied inverted mixed-highs, so R, G, and B signals with mixed highs are supplied from their outputs to the inputs of colorplexer 40 to be combined into a composite color signal in accordance with a selected standard, e.g. NTSC. This composite color signal is suitable for modulating a broadcast r-f carrier. The inverted mixed highs are shown as being obtained by adding the output signals from buffer amplifiers 31, 32, and 33 in an additive matrix 41 and filtering the result in a high-pass filter having a response complementary to low pass filters 34, 35, and 36. This high-pass filter is synthesized from a low-pass filter 42 identical to low-pass filters 34, 35, and 36; a delay line 43 providing a matching group delay, and a differential-input amplifier 44 for differentially combining the output responses of filter 42 and delay line 43 to signal supplied to their parallelled inputs from the output of additive matrix 41.

The shifting of C-register clock frequency pulses is accomplished using an electrically adjustable pulse phase-shifter 50 which may for example, comprise a multiply-tapped delay line (e.g., as provided by a cascade of amplifier stages) and a multiplexer for selecting the tap from which output signal is to be taken per commands from a digital decoder. Alternatively, the C-register clock pulse step transitions may be integrated to ramps and an analog voltage comparator can compare the ramps to the output voltage of a digital-to-analog converter (DAC), for re-timing the step transitions of clock pulses by delay adjustable responsive to digital control signal to the input of the DAC.

A correction signal generator 51 supplies a control input to phase-shifter 50 for each position of raster scan. Assuming the correction signal generator 51 to respond to the Cartesian coordinates of raster scan as defined by a pair of binary numbers, raster position counting circuitry 52 is provided to generate these numbers by counting pulses from the clock generator 21. The counting circuitry used for generating synchronizing signals for composite color signal signal generator 40 may be included in clock generator 21; and, if this be the case, separate raster position counting circuitry 52 will be unnecessary.

Figure 4:
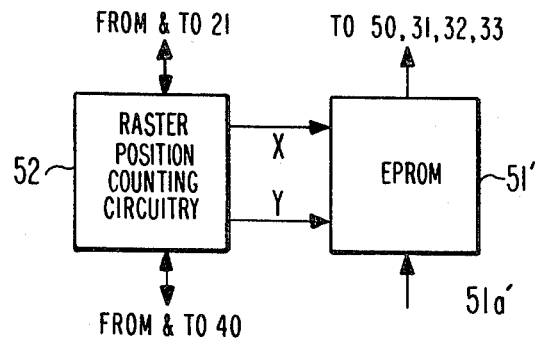
FIGS. 4 and 5 each show portions of specific embodiments of the FIG. 3 combination of apparatus.

Correction signal generator 51 may simply consist of, as shown in FIG. 4, an electrically programmable read-only memory (EPROM) 51' loaded with phase correction, information by the color television camera manufacturer at input 51'a. Automatic apparatus can adjust, on a pixel by pixel basis, the phase correction information for best color purity of one of the filter stripe colors while connection of EPROM 51' output to phase shifter 50 input is interrupted, with the adjusted phase-correction information then being loaded into the EPROM 51'.

Figure 5:
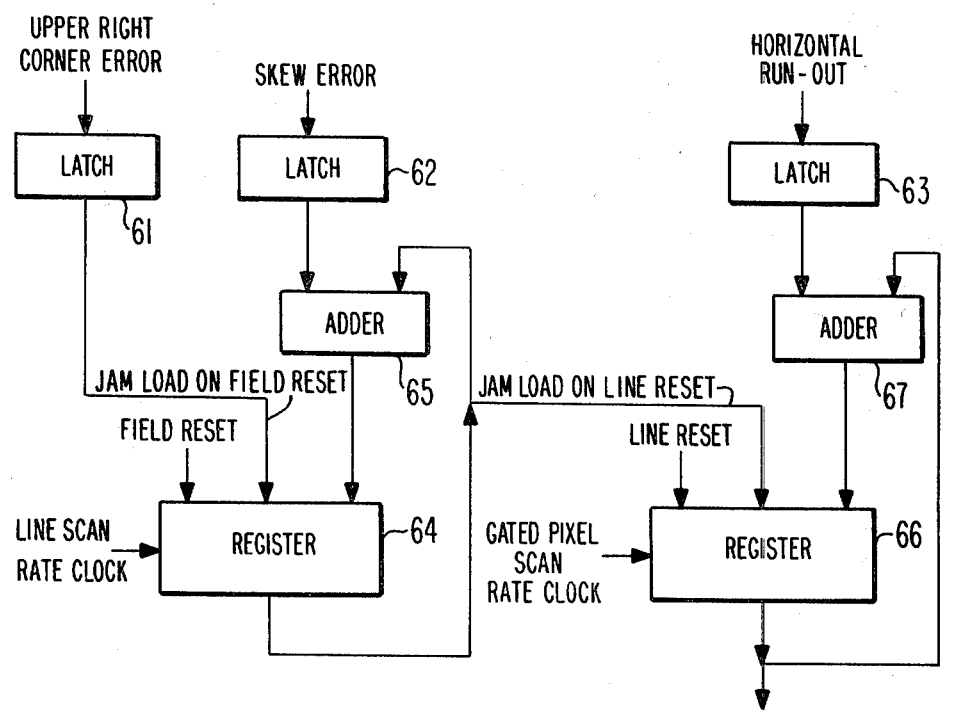

FIG. 5 shows an alternative way of storing the phase correction information in reduced form. The upper right corner error, the incremental skew error arising from skewing between filter stripes and CCD columns, and the incremental horizontal run-out error arising from disparity in filter-stripe and CCD-column widths are respectively loaded into latches 61, 62, and 63 by the manufacturer. The phase-correction information for the right edge of the image field is generated at register 64 output. The upper right corner error output of latch 61 is jam-loaded into register 64 at the beginning of the image field, and the skew error is accumulated at the beginning of each line by adding it to the register 64 output in an adder 65 and entering the resultant sum into register 64 to update it. The phase-correction information for any point in the image field is then generated at register 66 output, proceeding from the right edge error jam-loaded into register 66 at the beginning of each line scan of the image. The horizontal run-out error is accumulated at pixel scan rate by adding output from latch 63 to output from register 66 in adder 67, and the output of adder 67 is used to update the contents of register 66, then applied as control signal to adjust the phase shift provided C register clock frequency by phase-shifter 50.

A feeling for why the invention works can be obtained from the following analysis, made with reference to FIG. 6, which shows the relative spatial phasing of the color filter stripe positions and of the CCD imager channel positions for one line of the image register, plotted against the sample waveforms supplied to and from synchronous detectors 24, 25, and 26 when the image is a white field. The widths of the red, green, and blue filter stripes (labelled "r", "g" and "b", respectively) as projected onto the CCD imager channels will be assumed to be of uniform value w, as will be the widths of the CCD imager channels. The CCD channels (recurrently labelled with Roman numerals I, II, and III in cyclical groups of three) are assumed to be of the same uniform width w and to be misregistered respective to the images of the color stripes by an error, e.

When a uniform white field is transmitted to the color CCD imager as optical image, the voltages $V_I$, $V_{II}$, and $V_{III}$ detected in columns I, II, and III of the CCD imager will, from duty cycle considerations, have the following values, where r, g and b would be their values for perfect stripe registration on the CCD imager columns.

$$V_I = [r(w-e) + ge]/w \quad (1)$$

$$V_{II} = [g(w-e) + be]/w \quad (2)$$

$$V_{III} = [b(w-e) + re]/w \quad (3)$$

The ge/w, be/w, and re/w terms in $V_I$, $V_{II}$, and $V_{III}$ are the undesired cross-color errors in the color samples as supplied directly from the C register of the CCD imager. Electrically adjustable pulse phase shifter 50 is fed a control signal which shifts the phasing in which synchronous detectors 24, 25, and 26 sample their inputs from the outputs of multiplexers 74, 75, and 76 by e in the direction in scan time coordinates opposite to the direction in the parallel space coordinates describing the field line being scanned. The output signals R, G, and B respectively supplied from synchronous detectors 24, 25, and 26 will consequently have the following values, as determined from duty cycle considerations.

$$R = [V_I(w-e) - V_{II}e]/w \quad (4)$$

$$G = [V_{II}(w-e) - V_{III}e]/w \quad (5)$$

$$B = [V_{III}(w-e) - V_Ie]/w \quad (6)$$

Substituting from equations 1, 2, and 3 into equations 4, 5, and 6 after normalization of stripe width w to unity, one obtains equations 7, 8, and 9, following.

$$
\begin{aligned}
R &= [r(1-e) + ge](1-e) - [g(1-e) + be]e \\
  &= r(1-e)^2 - be^2 \quad (7)\\
G &= g(1-e)^2 - re^2 \quad (8)\\
B &= b(1-e)^2 - ge^2 \quad (9)
\end{aligned}
$$

If e is only a small fraction of unity width w, equations 7, 8 and 9 are closely approximated by equations 10, 11, and 12, following, where $e^2$ terms are dispensed with as being negligibly small. Note, these $e^2$ terms can be suppressed through matrixing, if desired, by subtracting slight amounts of G, B, and R signals from the R, G, and B signals.)

$$R = r(1-2e) \quad (10)$$

$$G = g(1-2e) \quad (11)$$

$$B = b(1-2e) \quad (12)$$

Examining these equations, for the conditions where the image is a red field, a green field, and a blue field, one notes that there is no substantial cross-color error in response to any image, only a relatively small amplitude error. For the image being a white field, the error is the same for all colors and does not introduce tinting into the white field response.

It can be illustrated by calculations similar to the foregoing that the invention works no matter whether the color stripes of filter 17 are misplaced rightward or leftward respective to the columns of the CCD imager 20 A-register, and no matter what the cyclic order of the stripes are. The invention works if the stripes of filter 17 are complementaries magenta, yellow and cyan instead of primaries red, green, and blue. The invention works if two of the stripes in each cycle of colors are primaries and the other is a complementary of one of them, or if two of the stripes in each cycle of colors are complementaries and the other their common primary component. This latter case is of interest where filter 17 is constructed from two optical flats with striped dichroic mirrors respectively reflective of different primary colors, disposed on surfaces joined to place the mirror stripes in the same optical plane, with the stripes overlapping in part. The invention works, though less well where filters with two color stripes and a clear stripe are used. In short, the colors of the filter stripes are not of concern insofar as the reduction of spurious sample content by the resampling procedure described above and chosen to meet the color matrixing requirements for deriving input signals to the colorplexer giving due regard to signal-to-noise considerations, etc.

The invention has been described with synchronous detectors 24, 25, and 26 being of types which detect the base-band components of the red, green, and blue samples. It has application as well when synchronous detectors 24, 25 and 26 include synchronous switching means for transposing the frequency components of these samples which fall in the baseband spectrum with those components falling in a harmonic spectrum. This may be done to suppress response to flicker noise in the output from the CCD imager.

The connections of synchronous switching pulse generator 27 to timing control inputs of synchronous detectors 24, 25, and 26 may be interchanged with the connections of synchronous switching pulse generator 77 to timing control inputs of multiplexers 74, 75, and 76 and similar results will be obtained insofar as correction for color filter stripe misregistration with the volumes of the CCD imager A-register is concerned. Multiplexers 74, 75, and 76 are synchronous switches in cascade connection with synchronous switches in the synchronous detectors 24, 25 and 26 and the order of cascaded switches that selectively connect two points is not of consequence since the multiplication provided by the cascade is commutative.

While the invention has been described with respect to a CCD imager of the vertical field transfer type, it has application as well to CCD imagers of other types; e.g., to the line transfer type. In fact, the invention is applicable to any color imager using discrete image sampling elements. It is useful, for example, in an imager where the samples from the discrete image sampling elements are clocked out of the imager using x-y addressing techniques, rather than using CCD shift registers.

Finally, referring back to FIG. 3, the ready availability of information relating to e from correction signal generator 51 makes it reasonably conventional to control the gain of the re-sampled CCD output signals responsive to e to eliminate from them amplitude errors (the −2e terms of equations 10, 11, and 12) that change brightness level. This may be done, for example as shown, by controlling, in parallel, the gains of amplifiers 31, 32, and 33 responsive to correction signal generator 51 output. More particularly, where the e term is a binary number, its value can be doubled by bit place shift and added to unity to develop a binary number descriptive of (1+2e) gain multiplier term for each CCD C register clock interval. This (1+2e) term used to multiply a signal with a (1−2e) error factor will eliminate first order error terms from the product, resulting in negligible error where e is substantially smaller than unity. Each of the amplifiers 31, 32, and 33 can then comprise an amplifier arranged to have its gain controlled by a digital input signal. More exact methods of dividing the gains of input signals to amplifiers 31, 32, and 33 by (1−2e) error factors to compensate against color desaturation can, of course, be designed by one skilled in the art of electronic circuit design and will be necessary where e approaches 50% of unity stripe width. Accommodation for such large e errors generally is not required, however, since the correction of such large color sampling errors is accompanied by appreciable loss in signal-to-noise ratio in the corrected color signal samples.

What I claim is:

1. A color television camera comprising:
   an imager having discrete sensing elements arrayed in columns and rows;
   a color stripe filter interposed in the optical path to said imager, so its stripes project to respective columns of sensing elements;

means for deriving from said imager discrete derived samples of the respective colors of the information imaged on the imager, which samples are subject to cross-color errors owing to misregistration of the projected stripes and the columns of sensing elements; and means for generating further color samples with reduced cross-color errors, including means for resampling said discrete samples to obtain said further color samples, each said further color sample comprising a portion of a derived sample differentially combined with a portion of an adjacent derived sample.

2. A color television camera comprising:

a color stripe filter having stripes that are cyclically ones of a set of n stripes of various colors, n being an integer greater than one;

an imager for furnishing successive samples of lines of an optical image at a sampling carrier frequency rate, as supplied from discrete image sampling elements thereof, including a raster generator for generating a raster scan for timing those samples;

optics for imaging an optical image with color stripe filtering on the discrete image sampling elements of said imager so the periodicity of the stripes on each line of image sampling elements substantially corresponds to the periodicity of the successive samples along that line;

means for synchronously detecting the output signal of said imager in n phases of said sampling carrier with predetermined interleaving in time, each phase of synchronous detecting sampling the output signal in a first polarity during the remainder of the first sample of output signal concurrent therewith and sampling the output signal in a second polarity opposite to the first polarity during the beginning of the second sample of output signal concurrent therewith;

means for electrically adjusting the phasing of said n phases of sampling carrier relative to generated raster scan; and correction signal generator means responsive to each point of raster scan for generating an adjustment signal for controlling said means for electrically adjusting the phasing of said sampling carrier phases, said adjustment signal having values such as to reduce cross-color errors in the synchronously detected imager output signal.

3. A color television camera as set forth in claim 2 wherein said correction signal generator means is a programmable read-only memory storing a value of correction signal for each pair of raster scan coordinates supplied from said raster generator.

4. A color television camera as set forth in claim 2 wherein said correction signal generator includes:

means for storing an intialization signal;

means for storing an incremental correction signal;

accumulator means for accumulating said incremental correction signal at line scan rate to form, at least at selected points of raster scan, said correction signal; and means for loading said accumulator means with said initialization signal before reading each successive field of the image from the imager output.

5. A color television camera as set forth in claim 2 wherein said correction signal generator includes:

means for storing an initialization signal;

means for storing an incremental correction signal;

accumulator means for accumulating said incremental correction signal at pixel scan rate to form, at least at selected points of raster scan, said correction signal; and means for loading said accumulator means with said initialization signal before reading each successive line of the image from the imager output.

6. A color television camera as set forth in claim 2 wherein said correction signal generator includes:

means for storing first and second values of incremental correction signal;

first accumulator means for accumulating said first value of signal at line scan rate;

second accumulator means for accumulating said second value of signal at pixel scan rate;

means for initializing said first accumulator means to a prescribed value at the beginning of each field; and means for initializing said second accumulator means to the output of said first accumulator at the beginning of each line, whereby said correction signal is supplied at the output of said second accumulator means.

7. A color television as set forth in claim 2 including means responsive to an adjustment signal from said correction signal generator means for adjusting the gains of said n phases of synchronously detected imager output signal, as supplied from said means for synchronously detecting.

* * * * *